E. P. FOLLETT.
Lantern.
No. 214,379. Patented April 15, 1879.
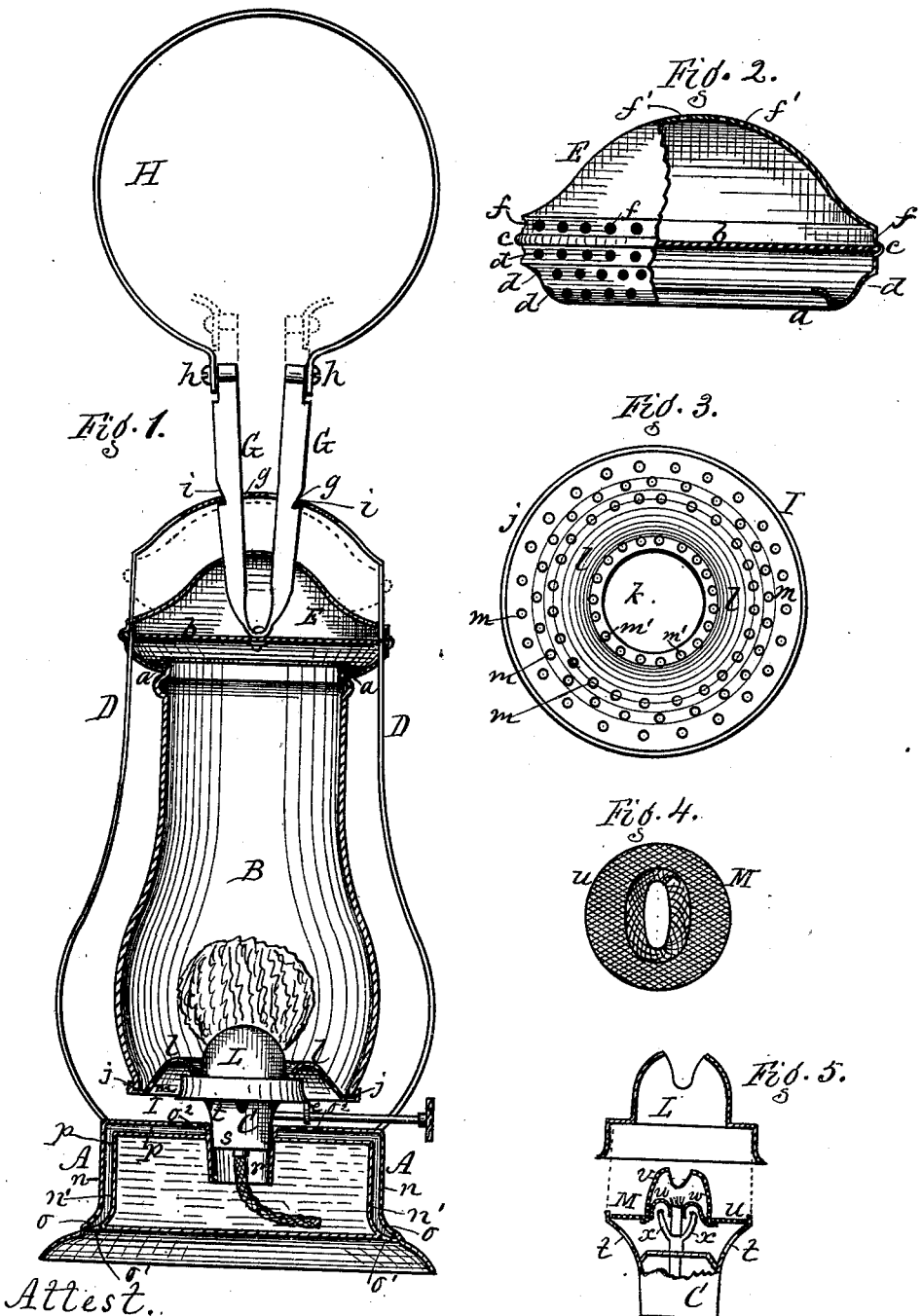

UNITED STATES PATENT OFFICE.

EDWARD P. FOLLETT, OF ROCHESTER, ASSIGNOR OF ONE-HALF HIS RIGHT TO ABEL J. BIXBY, OF LYONS, NEW YORK.

IMPROVEMENT IN LANTERNS.

Specification forming part of Letters Patent No. 214,379, dated April 15, 1879; application filed February 4, 1879.

*To all whom it may concern:*

Be it known that I, EDWARD P. FOLLETT, of the city of Rochester, county of Monroe, and State of New York, have invented a certain new and useful Improvement in Lanterns; and I do hereby declare that the following is a full, clear, and exact description of the same, reference being had to the accompanying drawings, in which—

Figure 1 is a central vertical section of my improvement. Fig. 2 is an elevation, partially in section, of the dome. Fig. 3 is a plan of the globe-support. Fig. 4 is a plan of the inside perforated cone. Fig. 5 is a vertical section of the burner, the exterior cone or deflector being raised.

My invention relates to lanterns; and consists in the construction and arrangement of parts hereinafter more fully described.

A is the oil-fount. B is the ordinary globe. C is the burner. D is a frame consisting of a strap of metal or wire attached fast to the base, and carried above the top of the lantern, as shown. It preferably conforms somewhat to the outline of the globe in order to present an ornamental appearance; but the sides of the upper portion are vertical and parallel, to form ways for the sliding dome, as hereinafter more fully described.

E is the dome or top of the lantern. It consists of a thin shell of metal, the upper portion being of convex form, with closed sides, and the lower portion being formed with a seat, $a$, to receive the top of the globe, and being open at the bottom. This dome has slots or openings at two opposite sides, through which pass the sides of the frame D, said dome being arranged to slide freely up and down on said sides. In this dome is also located a horizontal closed partition, $b$, which divides the dome into two separate and independent chambers.

The partition is conveniently attached by forming a bead, $c$, around its edges in the metal of the shell, as shown in Fig. 2.

$d\ d\ d$ are series of holes formed through the sides of the shell, and in the lower half communicating with the chamber beneath the partition. These holes are for the purpose of allowing escape of the draft which rises through the globe $ff$, and $f'f'$ are two series of openings in the upper half of the shell, above the partition.

The holes $ff$ are close down to the partition, and the holes $f'f'$ are at the top of the dome. These holes are for the passage of cold air into and through the upper chamber to keep the top of the dome cold, as that is the part that comes in close proximity to the hand.

The cold air enters through the bottom holes, $ff$, and escapes through the top holes, $f'f'$, and effectually prevents any overheating of the dome.

G G are two spring-arms attached to the dome, and extending up through the top of the same, and also through slots $g\ g$ in the top of frame D, and having pivoted to the top thereof the handle H, as shown at $h\ h$.

The handle is an open ring, and is made of spring metal, so as to spring out and in as the arms are opened and closed.

The arms have inclined notches $i\ i$, with abrupt shoulders at the bottom, as shown in Fig. 1.

When the dome is pressed down so as to rest upon the top of the globe, these shoulders spring under the edges of the slots $g\ g$ of the frame D, and thereby lock the dome securely down. When it is desired to remove the globe the handle is compressed, thereby closing the arms toward each other, and releasing the shoulders from their hold, and the dome is then raised into the position shown in dotted lines, Fig. 1. The globe can then be removed without difficulty.

The arms G G are preferably formed of a single piece of sheet metal, folded over or doubled at the top to make a double thickness of the arms, but being of full width at the bottom, at the bend, and said bottom being riveted or bolted to the center of partition $b$.

It is desirable to make the arms with a certain degree of spring-power, so that they will be self-acting independent of the handle, as the latter when grasped in the hand might have a certain restraint; but the spring of the handle is also requisite to follow the motion of the spring-arms.

I is the base-plate which supports the bottom of the globe. It is a circular disk of sheet metal struck up with an external vertical flange, $j$, to hold the globe in place, a central opening, $k$, to fit over the cone L, and a web or body which fills the whole space beneath the globe. This web has a convex swell, $l$, which stands up some distance, closely surrounding the cone, and forming a chamber for holding and heating the air before it escapes into the flame.

The plate has several tiers of air-holes $m\ m$ upon the outer side of the swell $l$, and a single tier of holes, $m'$, on the inner side, and close up as possible to the cone, leaving the body of the swell imperforate, as shown. The air which enters the outside holes is cold, and, coming in contact with the bottom of the globe, keeps the same cool. At the same time this air rises and feeds the top of the flame.

The inner holes, $m'$, rest over the top of the base of the cone, and the swell $l$ also becomes highly heated, and the air therein passes through the holes $m'$, closely around the cone, and feeds the bottom of the flame with highly-heated air.

In ordinary lanterns the base-plate for the globe is made plane and flat, and is not so effective as that above described.

The base of the lantern is made with an outer thickness, $n$, and an inner thickness, $n'$, the latter forming the oil-fount proper. A jacket-space, $p$, is left between these thicknesses. A set of exterior air-holes, $o$, open through the sides of the base into the bottom of this jacket-space. A similar series of holes, $o^1$, may also open from the bottom of the base into this jacket-space.

A set of holes, $o^2\ o^2$, are also located in the top of the base directly under the cone L. The air entering the holes $o\ o^1$ at the bottom is carried up through said jacket-space, and discharged through holes $o^2$ beneath the cone, which catches the same and conveys it to the blaze.

The jacketed base answers a double purpose: first, it keeps the oil-fount cool; and, second, it helps support the combustion by forcing a current of air up under the cone and into the blaze, a pressure of the air being produced by carrying the lantern, or by the blowing of the wind.

The air is so cut up and diffused in passing through the jacket-space and under the cone that there is no danger of extinguishing the light by the force of the current.

In the center of the base is an open-bottomed tube, $r$, which extends down about half the depth of the oil-fount. In this rests the bottom $s$ of the burner C.

Air-holes $t\ t$ are formed in the burner, and over it rests the exterior cone, L. This cone has on one side a notched lug, $e$, which shuts over the shaft of the elevating spur-wheel, as shown in Fig. 1, to keep the cone in place.

In the top of burner C rests an interior cone, M, made wholly of wire-cloth or any suitable perforated metal, such as copper or brass. It has a horizontal flange, $u$, which covers the whole top of the burner, a deflector, $v$, which is secured thereto by small spurs, which pass through and are clinched on the under side of the horizontal portion, and two corrugations or swells, $w\ w$, inside the cone, and on opposite sides of the wick-tube, as shown in Fig. 5. These corrugations recede from each other at the top, and allow the flame to spread out in opposite directions, and they catch and heat the air before it passes to the blaze, thereby greatly increasing the combustion. The air passes through all of the meshes of the perforated cone, and is cut up into fine jets.

On the wick-tube below the perforated cone are two inclined wings, $x\ x$, which project up into the corrugations $w\ w$, but without interfering with the passage of the air.

If desired, the frame D may have a circular guard near the bottom to stiffen it.

What I claim as new is—

1. In a lantern, the dome E, constructed with a horizontal partition, $b$, forming two chambers, the lower one having holes $d\ d$ for the escape of the draft, and the upper one having holes $f\ f$ and $f'\ f'$ for the passage of cold air, as described.

2. In a lantern, the combination of the frame D, the sliding dome E, and the locking-arms G G, as and for the purpose specified.

3. In a lantern, the combination of the frame D, the sliding dome E, the locking-arms G G, and the spring-handle H, as and for the purpose specified.

4. The base A, constructed with the double thicknesses $n\ n'$, with air-holes $o\ o$ at the bottom, and air-holes $o^2\ o^2$ at the top, opening beneath the cone L, as shown and described, and for the purpose specified.

5. The cone M, consisting of the horizontal flange $u$, deflector $v$, and the corrugations $w\ w$ within the deflector, as and for the purpose specified.

6. In combination with the deflector $v$ and corrugations $w\ w$, the wings $x\ x$, entering said corrugations, as and for the purpose specified.

In witness whereof I have hereunto signed my name in the presence of two subscribing witnesses.

EDWARD P. FOLLETT.

Witnesses:
R. F. OSGOOD,
JACOB SPAHN.